(12) United States Patent
Yoon et al.

(10) Patent No.: US 6,925,360 B2
(45) Date of Patent: Aug. 2, 2005

(54) AIR CONDITIONER CONTROL SYSTEM USING A TELEPHONE NETWORK AND METHOD FOR OPERATING THE SAME

(75) Inventors: Sang Chul Yoon, Kyungki-do (KR); Duck Gu Jeon, Seoul (KR); Jae Sik Jung, Seoul (KR); Jae Hwan Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 10/701,501

(22) Filed: Nov. 6, 2003

(65) Prior Publication Data

US 2004/0107024 A1 Jun. 3, 2004

(30) Foreign Application Priority Data

Dec. 2, 2002 (KR) .............................. 10-2002-0075976

(51) Int. Cl.[7] .............................................. G05B 13/00
(52) U.S. Cl. ..................................................... 700/276
(58) Field of Search ................................. 700/276, 278

(56) References Cited

U.S. PATENT DOCUMENTS

| | | | | | |
|---|---|---|---|---|---|
| 5,544,036 | A | * | 8/1996 | Brown et al. .......... | 340/825.24 |
| 6,510,212 | B2 | * | 1/2003 | Ito et al. ................ | 379/102.03 |
| 6,631,619 | B2 | * | 10/2003 | Nonaka et al. .............. | 62/126 |
| 2001/0048376 | A1 | * | 12/2001 | Maeda et al. .......... | 340/870.17 |
| 2002/0180581 | A1 | * | 12/2002 | Kamiwada et al. .......... | 340/5.2 |
| 2003/0061380 | A1 | * | 3/2003 | Saito et al. ................. | 709/238 |
| 2004/0003051 | A1 | * | 1/2004 | Krzyzanowski et al. .... | 709/217 |

* cited by examiner

*Primary Examiner*—Leo Picard
*Assistant Examiner*—Chad Rapp
(74) *Attorney, Agent, or Firm*—Greenblum & Bernstein, P.L.C.

(57) ABSTRACT

An air conditioner control system and method that uses a telephone network is provided. A remote electronic device is connected to a plurality of air conditioners through the telephone network to input a control command to each of the air conditioners. A control program is run in the remote electronic device to register profile information for the air conditioners. The air conditioners are configured to transmit and receive signals over there telephone network. The remote electronic device is configured to input control commands to some or all of the air conditioners on the basis of the registered profile information. A control command input by a remote user is automatically transmitted to a corresponding one of the air conditioners with reference to the registered profile information of the corresponding air conditioner.

4 Claims, 5 Drawing Sheets

AIR CONDITIONER CONTROL SYSTEM USING A TELEPHONE NETWORK AND METHOD FOR OPERATING THE SAME

CROSS-REFERENCE TO RELATED APPLICATION

The present application claims priority under 35 U.S.C. § 119 of Korean Application No. 2002-75976, which was filed on Dec. 2, 2002, the disclosure of which is expressly incorporated by reference herein in its entirety.

BACKGROUND OF THE INVENTION

1. Field of the Invention

The present invention relates to an air conditioner control system using a telephone network and a method for operating the same. More particularly, the present invention relates to an air conditioner control system, and a method for operating the same, wherein an electronic device at a remote location is connected to a plurality of air conditioners through the telephone network to input control commands to the air conditioners. A control program is run in the remote electronic device to register profile information for the air conditioners whereby control commands can be simply and conveniently input and transferred.

2. Description of the Related Art

A conventional air conditioner control system using a telephone network will be described with reference to FIG. 1.

Air conditioners generally include outdoor units and indoor units. In such an air conditioner, a coolant undergoes a thermal cycle of compression, condensation, expansion and evaporation while circulating through the outdoor and indoor units. In this manner, a cooling or heating operation is performed to condition the indoor air.

Home network systems have recently been developed in which a plurality of home appliances are connected to an internal network provided in a home or building. A server, in particular a home server, is connected to the internal network for controlling the home appliances in an integrated manner. The home server may be a home appliance which has a storage capability and sufficient data processing capacity to function as the server. Alternatively, a home server-dedicated device may be provided to centrally control the home appliances connected to the internal network.

Such a home network system may further provide a gateway function for connecting the home server to an external network, such as the Internet. This gateway function enables a remote user to accesses the home server in the home or building over the Internet to monitor the operating statutes of the plurality of home appliances controlled by the home server and to input control commands to each of the home appliances.

For such a home network system, a local area network (LAN) line must be provided in the home or building to enable smooth transmission and reception of signals among or between the home appliances connected to the internal network. A high speed Internet network provided on a regional or country wide basis is also necessary to facilitate the remote control of the home network system. However, such a home network system cannot be implemented in a region, country, or building, in which access to the Internet is limited.

To address the above problem, an air conditioner control system using an existing public switched telephone network (PSTN) has been developed which allows a remote user to remotely input control commands to a plurality of air conditioners installed in a home or building and to monitor the operating states of the air conditioners. A conventional air conditioner control system using the public switched telephone network is shown in FIG. 1.

As shown in FIG. 1, an air conditioner 10 is connected to a telephone terminal in a home or building so that it can b be connected with a calling party (remote user) through the public switched telephone network TN for transmitting and receiving signals to/from the calling party over the telephone network. The remote user can call the building or home where the air conditioner 10 is installed to establish a call connection. The remote user can then input a control command for the air conditioner 10 by manipulating buttons on a telephone 20. The control command is transferred to the air conditioner 10 over the public switched telephone network TN to control it However, such a conventional air conditioner control system using the public switched telephone network TN has a disadvantage in that only a simple operation of the air conditioner 10, such as an ON/OFF operation, can be controlled due to a limited number of buttons provided on the telephone 20. This limits the remotely controllable functions of the air conditioners, resulting in inconvenience to the user and inefficient and limited utilization of remote control capabilities.

SUMMARY OF THE INVENTION

Therefore, the present invention has been made in view of the above problems. It is an object of the present invention to provide an air conditioner control system using a telephone network and a method for operating the same. In he system and method, a remote electronic device, connected to the telephone network is operated to input control commands to some or all of the air conditioners in a home or building to be controlled. A control program capable of monitoring controlled operating states of the air conditioners is run in the remote electronic device to register profile information of the air conditioners. In this manner, at the same time that a remote user inputs a specific control command, the remote electronic device can automatically connect to the air conditioner corresponding to the specific control command in order to transmit and receive signals to/from the corresponding g air conditioner.

In accordance with one aspect of the present invention, the above and other objects can be accomplished by the provision of an air conditioner control system that uses a telephone network to control a plurality of air conditioners which are configured to transmit and receive signals over the telephone network. The control system includes a remote electronic device having a control program configured to receive profile information for each of the plurality of air conditioners, register the received profile information and transmit control commands to designated ones of the air conditioners over the telephone network on the basis of the registered profile information.

In accordance with another aspect of the present invention, a method of operating an air conditioner control system that uses a telephone networks provided. The method includes running an air conditioner control program in a remote electronic device to register profile information for a plurality of air conditioners, selecting one of the air conditioners to be controlled and inputting a control command for the selected air conditioner into the electronic device. The method also includes generating a control command data packet based on the input control command and the registered profile information for the selected air conditioner, and automatically transmitting the generated data packet over the telephone network to a telephone number associated with the selected air conditioner.

According to a feature of the present invention, profile information for an air conditioner is registered so that a control command can be automatically transmitted to the air conditioner from a remote location without performing a separate manual setting operation.

A graphic image-based registration window is displayed on a screen to enable a remote user to register and confirm the setting or profile information of the air conditioner. A display window is also provided on the screen to display information regarding the location of the air conditioner, a telephone number associated with the air conditioner, a unique ID of the air conditioner and other information, contained in the profile information of the air conditioner. Therefore, the remote user can input the control command for the air conditioner with reference to the profile information of the air conditioner.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
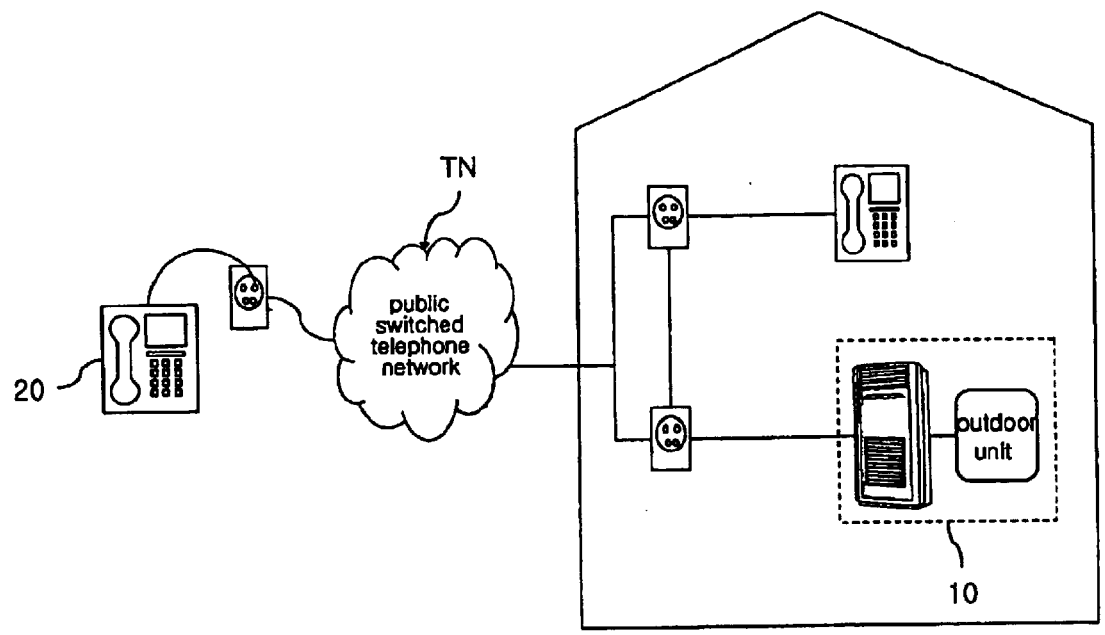
FIG. 1 is a view schematically showing the configuration of a conventional air conditioner control system using a telephone network.
Figure 2:
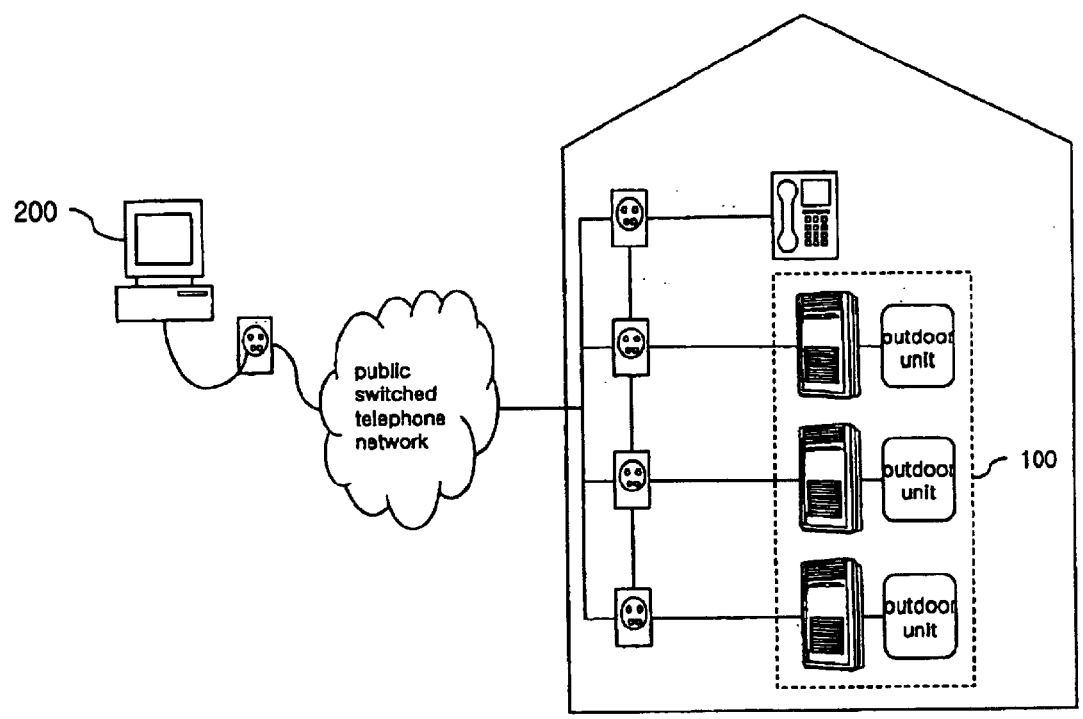
FIG. 2 is a view schematically showing the configuration of an air conditioner control system using a telephone network in accordance with an embodiment of the present invention.
Figure 3:
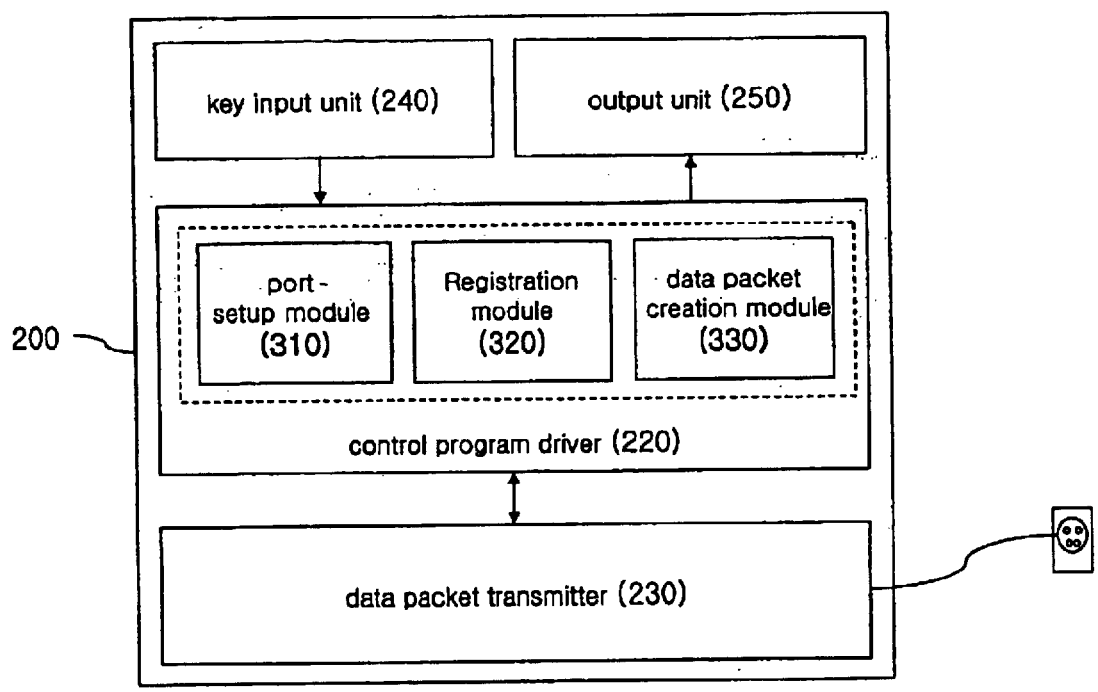
FIG. 3 is a block diagram of a remote electronic device in the air conditioner control system shown in FIG. 2.
Figure 4:
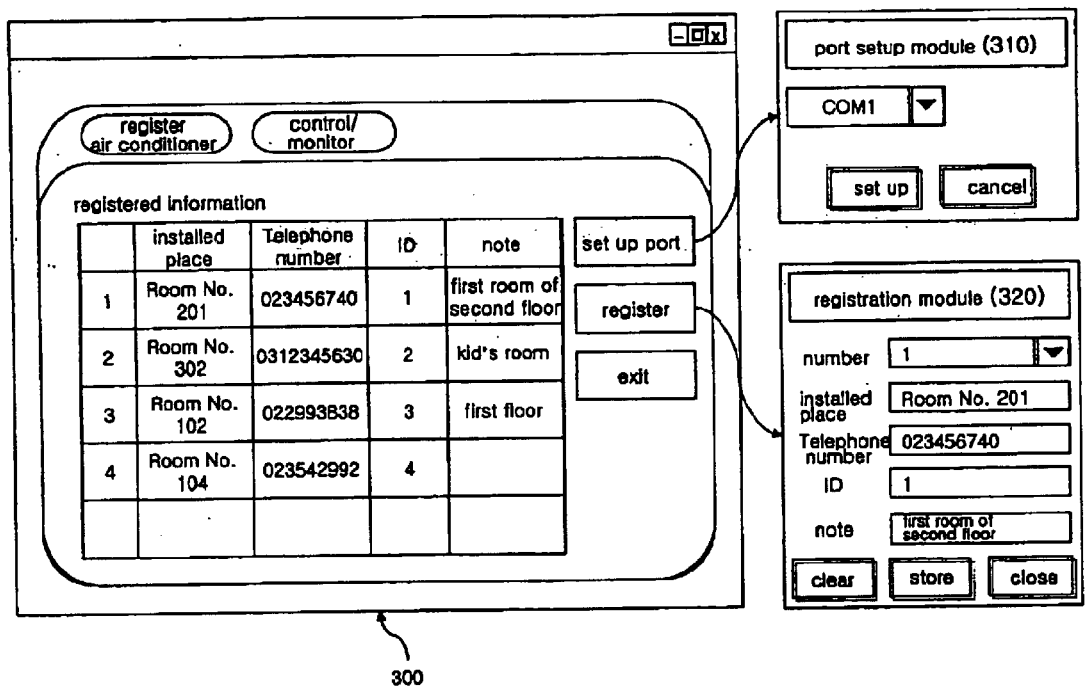
FIG. 4 is a view showing a preferred embodiment of a control program used in the air conditioner control system shown in FIG. 2.

FIG. 2 schematically depicts the configuration of an air conditioner control system using a telephone network in a accordance with an embodiment of the present invention. FIG. 3 is a block diagram of a remote electronic device in the air conditioner control system. FIG. 4 depicts a preferred embodiment of a control program used in the air conditioner control system in accordance with the present invention.

A plurality of air conditioners 100 are installed at various locations within a home or building to condition (i.e. heat or cool) indoor air. Each of the air conditioners 100 is connected to a telephone terminal at the location where it is installed, so that it is connected to an internal telephone network of the home or building. The internal telephone network is connected to a public switched telephone network (PSTN) via an exchange. As a result, a remote user can input control commands to the plurality of air conditioners 100 by making a call to a telephone number associated with the internal telephone network.

The remote user inputs control commands to the air conditioners 100 with an electronic device 200 at a remote location. The air conditioners 100 are each assigned a different, unique identification (ID). A Accordingly, even though the air conditioners 100 are associated with the same telephone number, the remote user can designate one of the unique IDs in order to transfer a control command to one of the air conditioners 100 corresponding to the designated unique ID.

The public switched telephone network PSTN is a telephone network that provides typical subscriber telephone services, such as voice and data switching services, to many subscribers via an exchange. In the public switched telephone network PSTN, a local switch performs switching to a telephone number dialed (i.e. input) by a calling party to access the dialed telephone number. After accessing the dialed telephone number, the local switch establishes a call connection between the calling party and a called party corresponding to the dialed telephone number.

The remote electronic device 200 preferably includes a control program driver 220 (FIG. 3) that drives a control program 300 through which a remote user can monitor information regarding the operating states of the plurality of air conditioners 100 and input control commands to the air conditioners 100. The remote electronic device also includes a data packet transmitter 230 that transmits control command data packets created by the control program 300 to a designated one of the air conditioners 100 over the public switched telephone network PSTN. The remote electronic device 200 further includes a wired or wireless modem (not shown) connected to the telephone network TN, a key input device 240 for entering control commands to the control program 300, and an output device 250. The output device 250 outputs information regarding control operation results and operating states of the air conditioners 100 resulting from the control commands input through the key input device 240.

Through use of the control program 300 driven by the control program driver 220, the remote user can transfer a control command to a specific one of the air conditioners 100 to be controlled, and monitor information about a controlled operating state of the specific air conditioner based on the control command. The control program 300 may be downloaded from the Internet through a Web browser run in the remote electronic device 200, includes a graphic user interface (GUI), for convenient remote control of the air conditioner operations.

The control program 300 allows a remote user to select a unique ID assigned to a specific air conditioner and input a control command for the specific air conditioner. The remote user may instead select and control some or all of the plurality of air conditioners 100. It is also possible to release the control over all selected air conditioners.

In order to access the plurality of air conditioners 100 connected to the internal telephone network, the remote user inputs profile information for each of the air conditioners 100 into the remote electronic device 200 to register the profile information in a database. Thereafter, when the remote user inputs control commands for the air conditioners 100, the control program 300 enables the remote electronic device 200 to rapidly perform data communication with the designated air conditioners on the basis of the registered profile information.

As shown in FIGS. 3 and 4, the control program 300 includes a port setup module 310 for selecting and setting up to a communications port (for example, any one of ports COM1 to COM4) for transmission and reception of signals to/from the plurality of air conditioners 100 connected to the internal telephone network. The control program 300 also includes a registration module 320 for registering the profile information of the air conditioners 100. The registration module 320 is configured to separately register the profile information for each of the air conditioners 100. The profile information of each of the air conditioners 100 may include any suitable information, such as a telephone number associated with a corresponding air conditioner, a unique ID of the corresponding air conditioner, information regarding the location of the corresponding air conditioner, and other notations. The control program 300 further includes a data packet creation module 330 for generating a control command data packet based on a control command input by the remote user.

When the profile information of each of the air conditioners 100 is registered, it is stored in the database of the remote electronic device 200. When a control command is input through the control program 300 by the remote user, it is combined with the profile information of a designated air conditioner, which is stored in the database, to create a control command data packet. The remote electronic device 200 automatically transmits and receives signals to/from the corresponding air conditioner over a telephone line. It is also possible to modify or delete the profile information if necessary.

The remote electronic device 200 includes a suitable COM port (communications port), such as a serial or RS-232 port, which can be set up on a basic input output system (BIOS). When this COM port corresponds to the port selected and set up by the port setup module 310, the control command data packet can be transmitted to the telephone network through the set-up port The data packet transmitter 230 in the remote electronic device 200 is configured to receive the control command data packet generated by the data packet creation module 330, and to automatically transmit the received data packet to a telephone number connected with the corresponding air conditioner over the telephone network.

Figure 5:
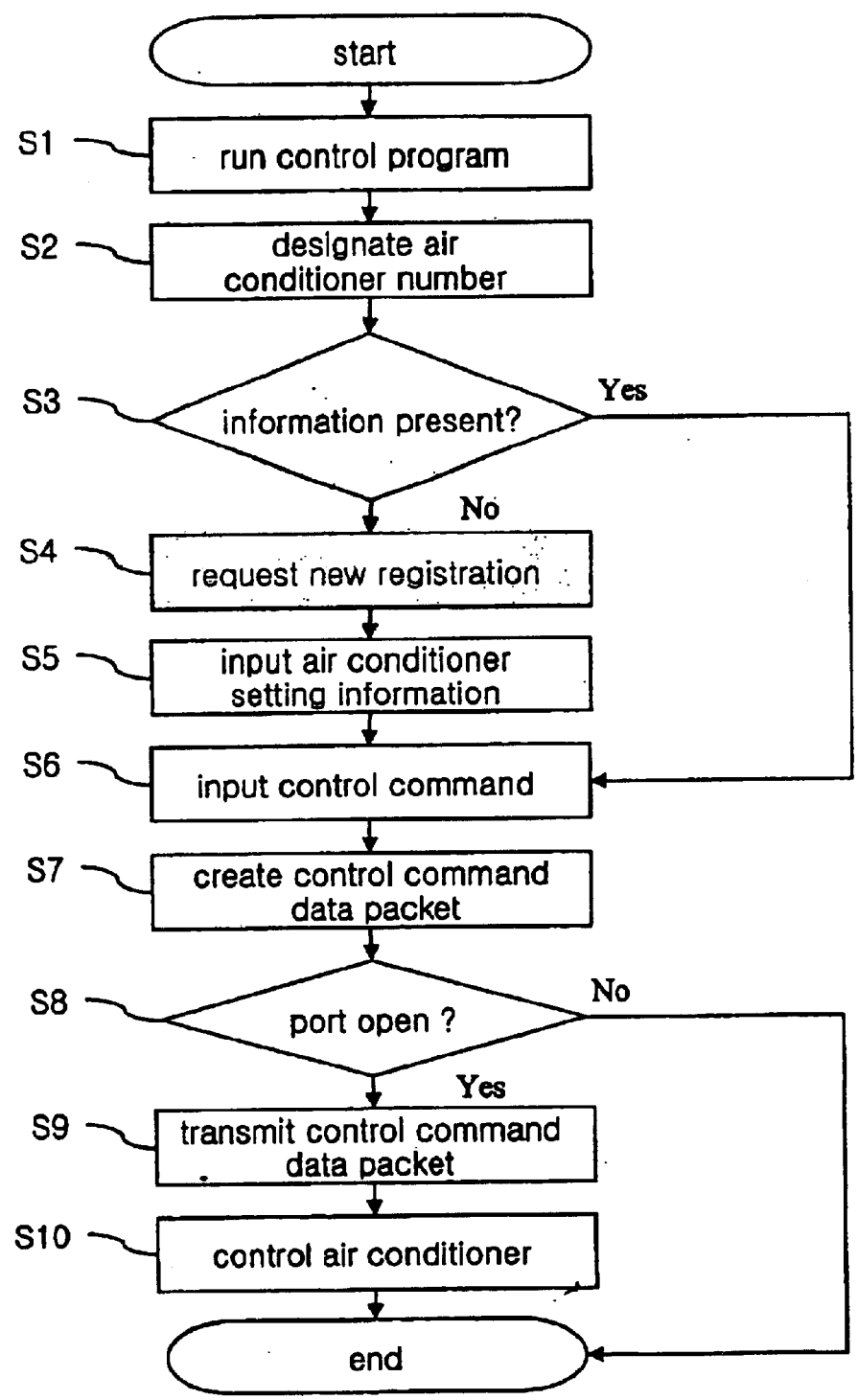
FIG. 5 is a flow chart illustrating the operation of the air conditioner control system using the telephone network in ac accordance with the present invention.

The operation of the telephone network-based air conditioner control system in accordance with the present invention will now be described with reference to FIG. 5.

First, the air conditioner control program running in the remote electronic device (S1) accesses the database with ti the profile information of the air conditioners to load the profile information.

After the profile information is loaded, a remote user selects a specific one of the air conditioners to be controlled by designating a number or ID of the specific air conditioner from among the profile info formation through the control program (S2). In a situation where there is no profile information for the specific air conditioner in the database, or if the database is not accessible (S3), then there is no profile information for the control program to combine with a control command to create a control command data packet. Instead, the control program requests the remote user to register the profile information of the specific air conditioner (S4) by displaying an appropriate message. However, if the profile information of the specific air conditioner is present in the database, the remote user may proceed to input a control command.

If the new registration is requested, the remote user must input the profile information of the specific air conditioner. As explained above, suitable profile information may include location of the specific air conditioner, a telephone number connected with the specific air conditioner, a unique ID of the specific air conditioner and other notations regarding setting up a communication port for connection with the specific air conditioner (S5).

After selecting the specific air conditioner, the remote user inputs a control command for an operation of the air conditioner (S6) and then clicks an execution button. Any suitable control command may be used, such as for controlling air direction, air volume, or air temperature. If the control program confirms the ID of the specific air conditioner, the telephone number connected therewith, and the set-up communication port, a control command data packet is generated which contains the control command (S7).

A determination is made as to whether the set-up communication port is in its open condition (S8). In the situation where the set-up communication port is determined to be in its closed condition, the control process is ended because it is impossible to conduct data communication. However, if the set-up communication port is determined to be in its open condition, the generated control command data packet is transmitted from the remote electronic device over the telephone network to the telephone number connected with the specific air conditioner (S9). After receiving the transmitted control command data packet, the specific air conditioner reads the control command contained in the received data packet and performs a control operation associated therewith (S10).

After performing the control operation, the specific air conditioner generates data regarding its controlled operating state and transmits the generated data back to the remote electronic device. The remote user can thus monitor the controlled operating state of the specific air conditioner through the control program run in the remote electronic device.

As is apparent from the above description, the present invention provides an air conditioner control system using a telephone network and a method for operating the same. Profile information of a plurality of air conditioners is registered and stored in a database. Control commands for the air conditioners are input through a control program that is downloaded through a web browser and implemented with a GUI. Control command data is automatically transmitted to the air conditioners on the basis of the profile information stored in the database, resulting in improved convenience of remote control and automation Further, a remote user can input more accurate control commands for the air conditioners because the control program provides details of the operating states of the air conditioners.

It should be noted that, although the term "packet" is used herein, any form of network communication is within the scope and spirit of the present invention. It should also be noted that it is within the spirit and scope of the present invention to operate in any suitable wired or wireless network.

While the term "air conditioner" used herein encompasses devices which cool and dehumidify air, the term also includes heating devices, humidifiers, dehumidifiers and other devices which "condition" the ambient air.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A control system for conditioning air, comprising:
   an electronic device that executes a control program having:
      a registration module configured by a remote user to store profile information including an identification of a conditioning system to be controlled;

a data packet creation module that generates a control command data packet based on said stored profile information and a control command inputted by the remote user; and a data packet transmitter that transmits said generated control command data packet over a PSTN to the conditioning system associated with said profile information to control an operation of the conditioning system, wherein the conditioning system is interfaced to the PSTN, said identification of the conditioning system stored in the profile information further comprising a telephone number associated with the PSTN interfaced conditioning system.

2. A control system for conditioning air, comprising:

an electronic device that executes a control program having:
  a registration module configured by a remote user to store profile information including an identification of a conditioning system to be controlled;
  a data packet creation module that generates a control command data packet based on said stored profile information and a control command inputted by the remote user; and
  a data packet transmitter that transmits said generated control command data packet over a communications link to the conditioning system associated with said profile information to control an operation of the conditioning system, wherein said electronic device controls a plurality of conditioning systems, said registration module storing profile information uniquely identifying each conditioning system, said communications link comprising a PSTN, each conditioning system of the plurality of conditioning systems being interfaced to the PSTN, the profile information storing a telephone number and a unique identifier that are associated with the each conditioning system.

3. A method for controlling a conditioning system, comprising:

executing a control program in a remote electronic device to store profile information including an identification of a conditioning system to be controlled;

inputting a control command representing a desired operation to be performed by the conditioning system;

generating a control command data packet based on the stored profile information and the inputted control command; and transmitting the generated control command data packet over a PSTN to the conditioning system associated with the profile information so that the conditioning system performs the desired operation, wherein storing profile information including an identification comprises storing profile information including a telephone number associated with the conditioning system.

4. A method for controlling a conditioning system, comprising:

executing a control program in a remote electronic device to store profile information including an identification of a conditioning system to be controlled;

inputting a control command representing a desired operation to be performed by the conditioning system;

generating a control command data packet based on the stored profile information and the inputted control command; and transmitting the generated control command data packet over a communications link to the conditioning system associated with the profile information so that the conditioning system performs the desired operation, the remote electronic device controlling a plurality of conditioning systems, the control program being executed to store profile information uniquely identifying each conditioning system, wherein transmitting the generated control command data packet over a communications link comprises transmitting the generated control command data packet over a PSTN, each conditioning system of the plurality of conditioning systems being interfaced to the PSTN, the profile information including a telephone number and a unique identifier that are associated with each conditioning system.

* * * * *

UNITED STATES PATENT AND TRADEMARK OFFICE
CERTIFICATE OF CORRECTION

PATENT NO.    : 6,925,360 B2
DATED         : August 2, 2005
INVENTOR(S)   : S. C. Yoon et al.

It is certified that error appears in the above-identified patent and that said Letters Patent is hereby corrected as shown below:

<u>Title page,</u>
Item [57], ABSTRACT,
Line 8, "there" should be -- the --.

Signed and Sealed this

Twenty-eighth Day of March, 2006

JON W. DUDAS
*Director of the United States Patent and Trademark Office*